April 1, 1930.  W. F. HEROLD  1,752,983
CASTER
Filed Dec. 5, 1927  2 Sheets-Sheet 1

INVENTOR.
WALTER F. HEROLD.
BY
ATTORNEY.

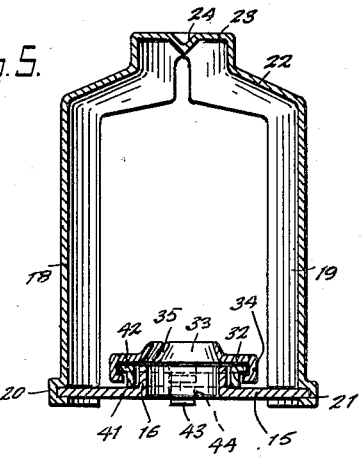
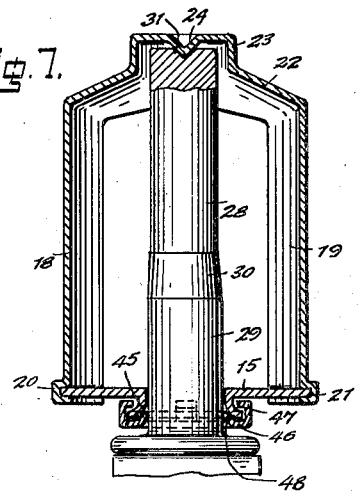
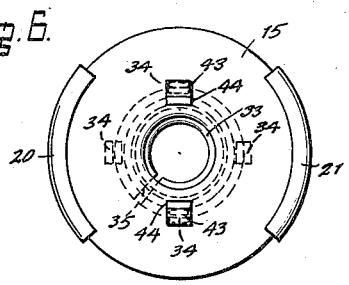
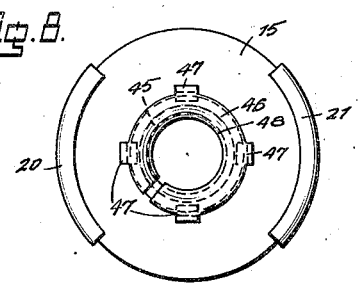
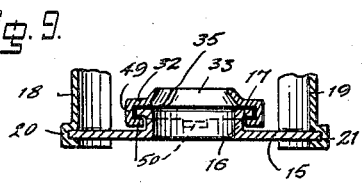
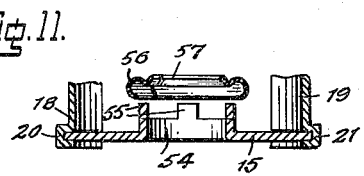
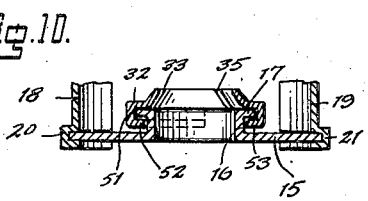
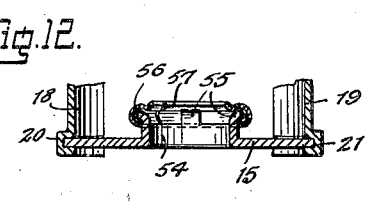

Patented Apr. 1, 1930

1,752,983

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed December 5, 1927. Serial No. 237,660.

The present invention relates to improvements in casters, particularly of the type having a caster socket or frame in which the caster pintle is inserted, and has for its principal object to provide improved retaining means for removably securing the caster pintle in place, and which at the same time will permit free swiveling of the caster. Another object is to provide such means associated with the base of the socket, so that the frame of the socket and the pintle may be at any desired size or shape, without regard to the retaining means, and further to provide such means of very simple and economical construction adapted to be assembled conveniently by modern production methods. A still further object is to provide such retaining means which will be self-centering in the detached relation of the pintle, so that there will be no possibility of the pintle jamming against the same during insertion, and which in its operative relation with the pintle will have unimpeded swiveling movement.

With the above and other objects in view, embodiments of the invention are shown in the accompanying drawings, and these embodiments will be hereinafter more fully described with reference thereto, and the invention will be finally pointed out in the claims.

In the drawings:—

Fig. 5 is a vertical sectional view of a socket, embodying a modified form of the invention;

Fig. 6 is a bottom plan view thereof;

Fig. 7 is a vertical sectional view of a further modified form, and showing the caster pintle in place.

Fig. 8 is a bottom plan view thereof;

Figs. 9 and 10 are sectional views showing still further modifications;

Figs. 11 and 12 are sectional views showing another modification; Fig. 11 showing the parts in their relation before assembly, and Fig. 12 showing the same assembled.

Similar reference characters indicate corresponding parts throughout the several figures of the drawings.

Figure 1:
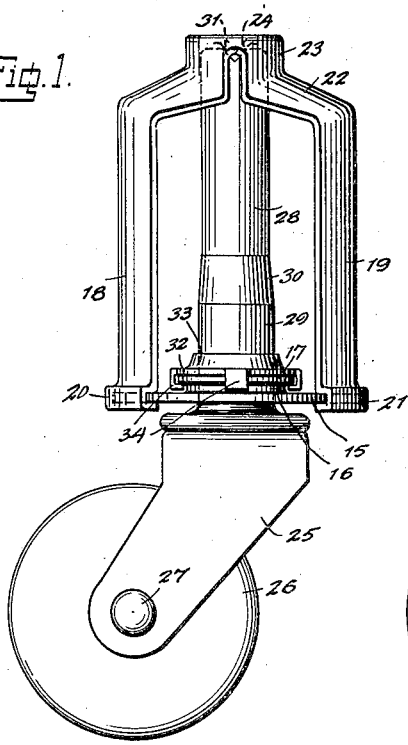
Fig. 1 is a side elevation of a top bearing caster assembly, according to one embodiment of the invention.
Figure 2:
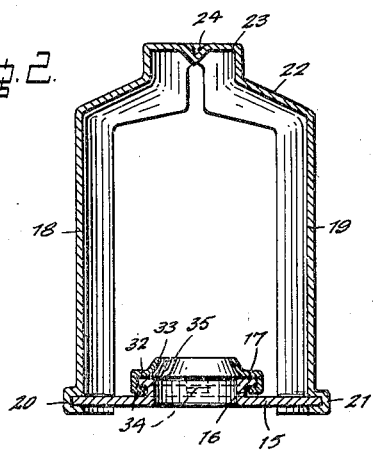
Fig. 2 is a vertical sectional view of the socket member, as shown in Fig. 1.
Figure 4:
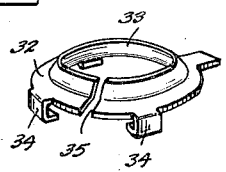
Fig. 4 is an enlarged perspective view of the spring ring employed according to one embodiment, and showing the same before assembly.

Referring to the drawings and more particularly to Figs. 1, 2 and 4 thereof, the caster according to the embodiment shown therein, is adapted for insertion in a tubular metal leg, and comprises a base plate or washer 15 having a central aperture, flanged upwardly as at 16 to provide a bearing for the pintle and having a lateral flange 17 bent outwardly from the flange 16 to provide supporting means for the pintle retaining spring ring, hereinafter more fully referred to. The frame consists of side leg portions 18 and 19, bent at their lower ends about the periphery of the base plate, as at 20 and 21, to secure the frame thereto, and a connecting top portion 22 provided with a central domed portion 23 having a top pintle bearing 24 pressed therein, this bearing being in the form of an inverted cone.

The detachable caster consists of the usual horn 25 having a caster wheel 26 rotatably carried therein upon an axle 27, and having a pintle 28 secured in its upper transverse portion, the pintle being provided at its lower portion with an enlarged diameter cylindrical portion 29, tapering as at 30, to the upper smaller diameter portion. At the upper end of the pintle there is provided a cone-shaped recess 31, adapted to engage the center top bearing 24 of the frame.

The pintle retaining means, according to the present embodiment, consists of a split spring ring 32 adapted to be rotatably connected to the flange 17 and to frictionally grip upon the pintle. In the embodiment disclosed it is formed of sheet metal and consists of a flat outer portion adapted to seat upon the flange 17 and a beveled flanged inner portion 33, the latter having the two-fold function of imparting the necessary springiness or tension to the sheet metal and providing a beveled lead surface for guiding the pintle into the socket without any chance of jamming or distorting the ring. At the outer edge of the ring there are provided a series of projecting lugs 34, four as shown, bent downwardly and inwardly about the flange 17 to connect the ring thereto, these lugs adapted upon contraction of the ring, with the pintle removed to centralize the ring upon the flange 17, and through slight gripping relation with said flange to retain the ring against movement, the same being free, however, in the expanded relation with the pintle inserted. The split 35 is preferably midway between two of the lugs. As shown in Fig. 4, the ring may be preferably formed with three of the lugs bent into retaining relation, so that the ring may be simply slipped over the flange 17 and thereupon secured by bending the fourth lug. In the inoperative or unexpanded relation of the ring, as shown in Fig. 2, the same projects slightly within the diameter of the pintle bearing flange 16, but is of larger diameter than the reduced upper portion of the pintle so that the latter may be easily inserted for a substantial distance before the gripping action of the ring takes place. The enlarged lower portion 29 of the pintle will expand the ring and thus be held thereby against dropping out of the socket, the ring being snugly held about the pintle and freely rotatable with respect to the flange 17, so that there is no tendency to frictionally resist or retard the swiveling action of the caster. The pintle, it will be observed, has top bearing upon the center top bearing 24 and is held vertically by the substantial bottom bearing provided by the flange 16, the flanged structure of the base providing a very strong rigid construction, adapted to withstand heavy side strains.

Figure 3:
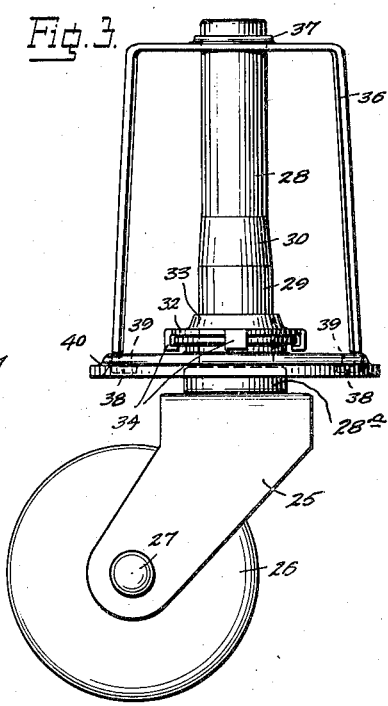
Fig. 3 is a side elevation of a modification showing the invention as adapted to a bottom bearing caster.

In Fig. 3 I have illustrated a modified form of socket frame in which the present improvements are embodied. In this form the socket includes an inverted U-shaped spring frame 36 having a flanged aperture 37 in its upper transverse portion for receiving the upper end of the pintle, and having lugs 38 at the lower ends of its side leg portions engaged in slots 39 in the base plate and bent inwardly upon the under side, to thereby connect the spring frame to the base plate and permit inward contraction of the side leg portions in their engaged relation with the tubular metal leg. The base plate is preferably flanged at its periphery as at 40, to provide an annular seat for the tubular leg. The pintle is provided with a thrust bearing base 28ª adapted to bear upon the base 15 and is held vertically by the flange 16 of the base plate and the flanged aperture 37 of the spring frame. While I have illustrated these two types of sockets, it will be obvious that the invention may be embodied in numerous other types comprising a socket and a removable pintle.

In Figs. 5 and 6, I have illustrated a modification in which a separate securing member is provided upon the base 15 for the spring ring in annular surrounding relation to the bottom pintle bearing flange 16, and consisting of a cylindrical ring 41, provided with an outwardly bent flange 42 at its upper edge and secured to the base plate by means of lugs 43 engaged through slots 44 in the base plate and bent over upon its under side. The spring ring 32 is engaged with the flange 42 in substantially the same manner as with the flange 17 of the first embodiment.

In the further modification illustrated in Figs. 7 and 8 the base plate 15 is provided with a downwardly bent bottom bearing flange 45, curved outwardly to provide an annular recess for receiving the securing lugs of the split spring ring. The spring ring 46 is rotatably secured to the flange by means of lugs 47 bent upwardly and inwardly with respect to the flange 45, and is provided with a beveled flange 48 bent inwardly and substantially conforming to the curve of the flange 45, while the flange 48 of this embodiment is in reverse relation to the flange 32 of the first embodiment and also serves the two-fold function of imparting springiness to the sheet metal and providing a lead surface for engagement of the pintle.

In Figs. 9 and 10 I have illustrated two modified forms of split spring rings. In the form shown in Fig. 9 the ring is provided with a downwardly bent flange 49 at its outer edge extending continuously about the outer edge of the flange 17 of the base, a series of securing lugs 50 being bent inwardly from the flange 49 into relation with the under side of the flange 17. In the form shown in Fig. 10 a continuous semi-circular flange 51 is bent downwardly from the ring and is provided with an inwardly bent flange 52 engaged beneath the flange 17, and in diametrically opposed relation to the flange 51 there is provided a securing lug 53 bent downwardly and inwardly about the flange 17. In practice the ring is slipped on the flange 17 before bending of the lug 53, the semi-circular formation of the flange 51 permitting this, and thereupon the lug 53 is bent into securing relation.

In Figs. 11 and 12, I have illustrated a still further modification in which the base plate is provided with a bottom pintle bearing flange 54 having at its upper edge a series of lugs 55, adapted through cooperation, during assembly, with the split spring ring to be bent into retaining relation with the ring. The ring 56 is of arcuate cross section, the curve extending laterally, and downwardly and inwardly, and is provided with an inner peripheral beveled flange 57, adapted to impart springiness and to form a lead surface for the pintle. In assembling the ring the same is forced downwardly upon the lugs and through the pressure applied the same are bent outwardly through engagement with the under curved surface of the lateral portion of the ring, and extend in retaining relation within the annular recess formed by the downwardly and inwardly bent portion.

In all of the several embodiments, it will be observed that in the contracted or inoperative relation of the ring the same is self-centered and held against movement by cooperation with its securing means, while in the expanded pintle retaining relation it is freely rotatable with the swiveling pintle.

I have illustrated preferred and satisfactory embodiments of the invention, but it will be obvious that changes may be made therein within the spirit and scope thereof, as defined in the appended claims.

Having thus described my invention, what I claim and desire to secure by Letters Patent is:—

1. In a support, a floor engaging element including a pintle, pintle receiving means adapted to be secured to a furniture leg or the like, a split spring ring adapted to be expanded and contracted, ring supporting means carried by said pintle receiving means having an annular pocket opening outwardly, and means carried by said ring and interlockingly engaged in said pocket and whereby said ring is rotatably retained with respect to said supporting means, said ring being adapted to retain said pintle with respect to said pintle receiving means.

2. In a support, a floor engaging element including a pintle, pintle receiving means adapted to be secured to a furniture leg or the like, a split spring ring element adapted to be expanded and contracted, a ring supporting element carried by said pintle receiving means, said ring element having an annular pocket, said supporting element having interlocking means engaged in said pocket and connecting said elements in rotatable relation, said ring element being adapted to retain said pintle with respect to said pintle receiving means.

3. In a support, a floor engaging element including a pintle, pintle receiving means for removably receiving said pintle and adapted to be secured to a furniture leg or the like, a split spring ring secured to said pintle receiving means and adapted to be expanded by engagement of said pintle and contracted upon removal of said pintle, and cooperating means acting between said ring and said pintle receiving means adapted to centralize said ring in its contracted relation, said ring adapted to retain said pintle with respect to said pintle receiving means.

4. In a support, a floor engaging element including a pintle, pintle receiving means adapted to be secured to a furniture leg or the like, a split spring ring adapted to be expanded and contracted, securing means carried by said pintle receiving means, and cooperating means acting between said ring and said securing means adapted to centralize said ring in its contracted relation and to loosely and rotatably retain the same in its expanded relation, said ring being adapted to grip said pintle and being rotatable therewith with respect to said pintle receiving means.

5. In a support, a floor engaging element including a pintle, pintle receiving means adapted to be secured to a furniture leg or the like, a split spring ring adapted to be expanded and contracted, securing means carried by said pintle receiving means, and connection means carried by said ring extending about the outer periphery of said securing means, and whereby expansion of said ring moves said connection means outwardly with respect to said securing means, said ring being adapted to grip said pintle and being rotatable therewith with respect to said pintle receiving means.

6. In a support, a floor engaging element including a pintle, pintle receiving means adapted to be secured to a furniture leg or the like, a split spring ring adapted to be expanded and contracted, annular ring supporting means carried by pintle receiving means including ring retaining means disposed transversely of the axis of said ring, and means carried by said ring extending transversely of its axis forming an annular pocket engaged by said ring retaining means and rotatably connecting said ring to said supporting means, said ring adapted to retain said pintle with respect to said pintle receiving means.

7. In a support, a floor engaging element including a pintle, pintle receiving means adapted to be secured to a furniture leg or the like, a split spring ring adapted to be expanded and contracted, annular ring supporting means including outwardly extending ring retaining means, and annular pocket forming means carried by said ring engaged about said retaining means to connect said ring thereto, said ring being adapted to retain said pintle with respect to said pintle receiving means.

8. In a support, a floor engaging element including a pintle, pintle receiving means adapted to be secured to a furniture leg or the like, a split spring ring adapted to be expanded and contracted and including an annular pintle lead portion, ring supporting means carried by said pintle receiving means, and interlocking means carried by said ring and extending about said supporting means adapted to retain said ring with respect to said support, said ring being adapted to retain said pintle with respect to said pintle receiving means.

9. In a support, a floor engaging element including a pintle, pintle receiving means adapted to be secured to a furniture leg or the like, a split spring ring element adapted to be expanded and contracted, a ring supporting element carried by said pintle receiving means, one of said elements having an annular space, the other of said elements having lugs bent into said space and connecting said elements in rotatable relation, said ring being adapted to retain said pintle with respect to said pintle receiving means.

10. In a support, a floor engaging element including a pintle, pintle receiving means adapted to be secured to a furniture leg or the like, a split spring ring element adapted to be expanded and contracted, a ring supporting element carried by said pintle receiving means, said supporting element having an annular space, and said ring having lugs bent into said space and connecting said elements in rotatable relation, said ring being adapted to retain said pintle with respect to said pintle receiving means.

Signed at Bridgeport, in the county of Fairfield and State of Connecticut, this 7th day of November, 1927.

WALTER F. HEROLD.

DISCLAIMER 1,752,983.—*Walter F. Herold*, Upper Montclair, N. J. Caster. Patent dated April 1, 1930. Disclaimer filed July 22, 1939, by the assignee, *The Bassick Company*.

Hereby enters this disclaimer to claims 3 and 4 in said specification.

[*Official Gazette August 15, 1939.*]